United States Patent
Nath (10) Patent No.: US 12,073,426 B2
(45) Date of Patent: Aug. 27, 2024

(54) ONLINE MARKETING CAMPAIGN PLATFORM

(71) Applicant: Devin Kumar Nath, Houston, TX (US)

(72) Inventor: Devin Kumar Nath, Houston, TX (US)

( * ) Notice: Subject to any disclaimer, the term of this patent is extended or adjusted under 35 U.S.C. 154(b) by 0 days.

(21) Appl. No.: 17/680,942

(22) Filed: Feb. 25, 2022

(65) Prior Publication Data

US 2022/0391937 A1    Dec. 8, 2022

Related U.S. Application Data

(60) Provisional application No. 63/159,551, filed on Mar. 11, 2021.

(51) Int. Cl.
| | |
|---|---|
| *G06Q 30/02* | (2023.01) |
| *G06Q 30/0203* | (2023.01) |
| *G06Q 30/0207* | (2023.01) |
| *G06Q 30/0217* | (2023.01) |
| *G06Q 50/00* | (2012.01) |
| *G10L 15/08* | (2006.01) |
| *G10L 15/18* | (2013.01) |
| *G10L 15/26* | (2006.01) |

(52) U.S. Cl.
CPC ..... *G06Q 30/0218* (2013.01); *G06Q 30/0203* (2013.01); *G06Q 30/0215* (2013.01); *G06Q 50/01* (2013.01); *G10L 15/083* (2013.01); *G10L 15/1822* (2013.01); *G10L 15/26* (2013.01)

(58) Field of Classification Search
CPC ........... G06Q 30/0218; G06Q 30/0203; G06Q 30/0215; G06Q 50/01; G10L 15/083; G10L 15/1822; G10L 15/26; G10L 2015/088
See application file for complete search history.

(56) References Cited

U.S. PATENT DOCUMENTS

| | | | |
|---|---|---|---|
| 8,265,610 B1* | 9/2012 | Delker | G06Q 30/0201 455/414.4 |
| 2009/0307312 A1* | 12/2009 | Ramaswamy | H04M 3/42221 709/205 |

(Continued)

OTHER PUBLICATIONS

University of Chicago, "Too Many Metrics of Social Media Influence" Jun. 8, 2020 (Year: 2020).*
History of Influencer Marketing (Year: 2017).*

*Primary Examiner* — Breffni Baggot (57) ABSTRACT

A computer-implemented method includes the operations of receiving marketing campaign data over a network from an originator computing device to establish a marketing campaign, wherein the marketing campaign data identifies one or more keywords and/or key phrases. The operations may further include causing the marketing campaign data to be accessible over a network to a participant computing device and receiving one or more audio file over the network from the participant computing device, wherein each received audio file includes spoken words of the participant recorded by a microphone on the participant computing device. The operations may additionally include determining, for each received audio file, a number of instances that the participant says the identified one or more keywords and/or key phrases in the received audio file, identifying a reward for the participant based on the determined number of instances, and crediting an account of the participant with the identified reward.

20 Claims, 5 Drawing Sheets

(56) References Cited

U.S. PATENT DOCUMENTS

2016/0189174 A1* 6/2016 Heath ................ G06Q 30/0201
                                                      705/7.29
2019/0172465 A1* 6/2019 Lee ......................... G10L 15/22
2019/0340634 A1* 11/2019 Paul ....................... G06Q 50/01

* cited by examiner

ONLINE MARKETING CAMPAIGN PLATFORM

CROSS-REFERENCE TO RELATED APPLICATIONS

This application is a nonprovisional patent application claiming the benefit of U.S. provisional patent application Ser. No. 63/159,551 filed on Mar. 11, 2021, which application is incorporated by reference herein in its entirety.

BACKGROUND

The present disclosure relates to online platforms that support marketing campaigns and reward participation in the marketing campaigns.

BACKGROUND OF THE RELATED ART

Digital marketing is a category of marketing that utilizes Internet and online-based digital technologies such as desktop computers, mobile phones and other digital media and platforms to promote products and services. Digital marketing may include, for example, search engine optimization, pay-per-click marketing, social media, content marketing, website promotion, online advertising, and email solicitation. Each of these techniques has their own unique strengths and weaknesses. Some techniques may be effective for promoting one type of product or service yet may be less effective for another type of product or service. In fact, many digital marketing strategies will involve some combination of these techniques. However, there is still a need for alternative digital marketing techniques and platforms.

BRIEF SUMMARY

Some embodiments provide a computer program product comprising a non-transitory computer readable medium and program instructions embodied therein, where the program instructions are configured to be executable by a processor to cause the processor to perform various operations. The operations may include receiving marketing campaign data over a network from a campaign originator computing device to establish a marketing campaign, wherein the marketing campaign data identifies one or more keywords and/or key phrases that are targeted by the marketing campaign. The operations may further include causing the marketing campaign data to be accessible over a wide area network to a campaign participant computing device and receiving one or more audio file over the wide area network from the campaign participant computing device, wherein each received audio file includes spoken words of the campaign participant recorded by a microphone on the campaign participant computing device. The operations may additionally include determining, for each received audio file, a number of instances that the campaign participant says the identified one or more keywords and/or key phrases in the received audio file, identifying a reward for the campaign participant based on the determined number of instances, and crediting an account of the campaign participant with the identified reward.

Some embodiments include a computer program product comprising a non-transitory computer readable medium and program instructions embodied therein, where the program instructions are configured to be executable by a processor to cause the processor to perform various operations. The operations may include receiving marketing campaign data over a network from a plurality of campaign originator computing devices to establish a plurality of marketing campaigns, wherein the marketing campaign data for each marketing campaign identifies one or more keywords and/or key phrases that are targeted by the marketing campaign. The operations may further include causing the marketing campaign data from the plurality of marketing campaigns to be accessible over a wide area network to a plurality of campaign participant computing devices and registering each of the campaign participant computing devices with at least one of the marketing campaigns. Still further, the operations may include receiving one or more audio file over the wide area network from the plurality of campaign participant computing devices, wherein, for each audio received file from one or the plurality of campaign participant computing devices, the audio file includes spoken words of the campaign participant recorded by a microphone on the campaign participant computing device. After determining, for each audio file received from one or the plurality of campaign participant computing devices, a number of instances that the campaign participant says the identified one or more keywords and/or key phrases, the operations may include identifying a reward for each campaign participant based on the determined number of instances and crediting an account of the campaign participant with the identified reward.

Some embodiments provide a computer-implemented method that includes various steps or operations. The steps or operations may include receiving marketing campaign data over a network from a campaign originator computing device to establish a marketing campaign, wherein the marketing campaign data identifies one or more keywords and/or key phrases that are targeted by the marketing campaign. The steps or operations may further include causing the marketing campaign data to be accessible over a wide area network to a campaign participant computing device and receiving one or more audio file over the wide area network from the campaign participant computing device, wherein each received audio file includes spoken words of the campaign participant recorded by a microphone on the campaign participant computing device. The steps or operations may additionally include determining, for each received audio file, a number of instances that the campaign participant says the identified one or more keywords and/or key phrases in the received audio file, identifying a reward for the campaign participant based on the determined number of instances, and crediting an account of the campaign participant with the identified reward.

DETAILED DESCRIPTION

Some embodiments provide a computer program product comprising a non-transitory computer readable medium and program instructions embodied therein, where the program instructions are configured to be executable by a processor to cause the processor to perform various operations. The operations may include receiving marketing campaign data over a network from a campaign originator computing device to establish a marketing campaign, wherein the marketing campaign data identifies one or more keywords and/or key phrases that are targeted by the marketing campaign. The operations may further include causing the marketing campaign data to be accessible over a wide area network to a campaign participant computing device and receiving one or more audio file over the wide area network from the campaign participant computing device, wherein each received audio file includes spoken words of the campaign participant recorded by a microphone on the campaign participant computing device. The operations may additionally include determining, for each received audio file, a number of instances that the campaign participant says the identified one or more keywords and/or key phrases in the received audio file, identifying a reward for the campaign participant based on the determined number of instances, and crediting an account of the campaign participant with the identified reward.

The computer program product may be executable by any one or more processor of any one or more computing device or system, such as one or more computer server. The computing system may be a standalone system, may be implemented in one or more public, private or hybrid (public/private) cloud computing environment, or some combination of standalone and cloud systems. Accordingly, one or more operations or one or more aspect of any one of the operations may be performed by a processor within any component of the computing system, such that the program instructions may be implemented in various parts of the computing system, if desired. In one example, some of the program instructions may be implemented in a standalone set of one or more application servers to perform a first subset of the operations, while some other program instructions may be implemented in one or more public cloud computing environment to perform a second subset of the operations. The one or more computers that are used to execute the program instructions may be referred to collectively as a host computing system.

In some embodiments, the computer program product that is executed by the host computing system may be referred to as a marketing campaign host application. The host computing system may be connected to a network providing communication with one or more campaign originator computing device and one or more campaign participant computing device. For example, the network may include a wide area network, such as the Internet. In some options, each campaign originator computing device and each campaign participant computing device may each be independently selected from a desktop computer, a laptop computer, tablet computer, smartphone, and the like. The marketing campaign originator application and the marketing campaign participant application may be separate applications or different modules of the same application. Accordingly, each campaign originator computing device and each campaign participant computing device may download the relevant application or relevant portion of the application from the application server or a third-party app store that is accessible over the network.

The marketing campaign host application receives marketing campaign data over a network from a campaign originator computing device to establish a marketing campaign. Preferably, the marketing campaign data identifies one or more keywords and/or key phrases that are targeted by the marketing campaign. For example, the one or more keywords and/or key phrases may describe a name, feature or characteristic of a product or service that is a subject of the marketing campaign. In one option, the marketing campaign data may further include one or more reward to be given to one or more campaign participants in exchange for their promotional activity. For example, the reward may be a monetary credit or other benefit that can be automatically awarded to the one or more campaign participants, such as with an online transfer or credit. In another option, the marketing campaign data may further include a maximum number of instances of the one or more keywords and/or key phrases that may be counted from within a single audio file.

The marketing campaign data may be made accessible over a wide area network to any number of campaign participant computing devices. Accordingly, the variety and number of campaign participants may change over time and any registered or prospective marketing campaign participant may gain access to the marketing campaign data for marketing campaigns that are currently available for participation. In one option, the marketing campaigns may be organized by categories, such as personal passions or interests, to facilitate an individual participant to view marketing campaigns that are relevant to such passions or interests. For example, a participant may use a search feature or menu to locate marketing campaigns that are relevant to their passion or interests. Once selected, a participant may register for the marketing campaign and begin promotional activities and include recording conversations that include use of the one or more keywords and/or key phrases identified in the marking campaign data.

The marketing campaign host application receives audio files over a network from a campaign participant computing device as evidence of promotional activities in support of the marketing campaign. Preferably, the audio file includes audio recorded by the campaign participant computing device which includes one or more keywords and/or key phrases that are targeted by the marketing campaign. Specifically, the marketing campaign participant application may include a user interface with a touch sensitive button that activates a microphone on the campaign participant computing device to begin recording to a new audio file. The audio file may be transmitted by the campaign participant computing device over the wide area network to the campaign host computing system in a series of chunks or as a single transfer. If the campaign host computing system receives the audio file in chunks, the host computing system may then stitch the chunks into a single audio file. In some embodiments, the operations of the host application or the campaign participant application include determining a duration of each audio file.

The operations of the host application may include determining, for each received audio file, a number of instances that the campaign participant says the identified one or more keywords and/or key phrases in the received audio file. In some embodiments, this determination may include translating the spoken words in each audio file into text and counting the number of instances of the one or more keywords and/or key phrases in the text. The operations may further include using natural language processing to determine a sentiment indicator that identifies whether the text in the text file indicates that the campaign participant expressed positive or negative sentiment regarding each instance of the one or more keywords and/or key phrases in the text. Optionally, each instance of the one or more keywords and/or key phrases in the text is counted only if the instance is associated with a positive sentiment indicator. In a further option, the text file may be redacted to eliminate sensitive personally identifiable information from the text file and/or the text file may be deleted at any point after counting instances of the keywords and/or key phrases identified within the text file.

In some embodiments, the marketing campaign host application may send the one or more audio file over the wide area network to an application programming interface for a speech-to-text transcription service of a cloud computing platform. Accordingly, the host application may subsequently receive a text file over the wide area network from the cloud computing platform, wherein the text file includes the text transcribed from the audio file.

In some embodiments, the marketing campaign host application may send the text file over the wide area network to an application programming interface for a natural language processing service of a cloud computing platform. The marketing campaign host application may subsequently receive a sentiment indicator over the wide area network from the cloud computing platform, wherein the sentiment indicator identifies whether the text in the text file indicates that the campaign participant expressed positive or negative sentiment regarding the instances of the one or more keywords and/or key phrases. Optionally, the speech-to-text transcription service and the natural language processing service may be provided by the same cloud computing platform, such that the text file output from the speech-to-text transcription service is directly provided to the natural language processing service of the same cloud computing platform.

In some embodiments, an audio processing module or engine may be operated on a cloud computing platform. A non-limiting example of a cloud computing platform is available from Amazon Web Services (AWS). AWS Marketplace offers a speech-to-text transcription service and a natural-language processing service (Amazon Comprehend) that may be accessed using application programming interfaces (APIs). An application programming interface (API) is a software interface that offers a service to other software, which software may be on the same or different computers. Once a transcript or text file has been generated, the text file may be provided to AWS Comprehend for natural language processing (NLP) to identify key phrases, entities, language, and sentiment within the text file. For example, the output of the NLP service may include identified keywords and a number of instances ("a count") of the identified keywords. Using the information output from AWS Comprehend, the host computing system may compare the keywords and their count against keyword rules defined in the marketing campaign data of one or more marketing campaign. The keywords and their count may then be used to measure the campaign participant's level of promotional activity.

In some embodiments, a key phrase extraction module or feature of a natural language processing module may identify instances of one or more identified key phrase within the audio file, a count of the number of instances that each key phrase is repeated within an audio file, and one or more confidence score. The confidence score may be an indication of how likely it is that a particular utterance in the audio recording is one of the identified key phrases. For example, the confidence score may range from zero (0) to one (1), wherein zero indicates no confidence and 1 indicates certainty. In one option, the audio processing module running on the host computing system and/or a cloud computing platform may utilize a predetermined confidence score threshold to determine whether or not an utterance in the audio file is a valid match with a keyword or key phrase designated in the marketing campaign data for a marketing campaign to which the participant is registered. For example, if the predetermined threshold value for the confidence score is 0.50 (on a zero (0) to one (1) scale), then only those keyword or key phrases with confidence scores greater than 0.50 are counted as a valid match. Potential keywords or key phrases having a confidence score that is less than about 0.50 may be invalidated or discarded and not counted. The audio processing module or engine used by the host computing system may increment a count of the keyword or key phrase after each instance, such that a total count of instances may be identified for each keyword or key phrase mentioned in a particular audio file.

In some embodiments, the reward for a campaign participant may be identified based on the campaign participant's level of participation in one or more marketing campaign. For example, the reward may be determined based entirely, or in part, on the number of instances that the campaign participant uses the one or more keywords and/or key phrases in one or more audio file provided to the marketing campaign host application.

In some embodiments, the reward for the campaign participant may be identified based on a calculated scored that represents the participant's level of participation in one or more marketing campaign. For example, the score may be calculated for a particular campaign participant based on the number of instances that the keywords and/or key phrases are mentioned by the campaign participant in the audio files for a particular marketing campaign and the increase in a number of people ("followers") following the campaign participant on that particular day.

In some embodiments, the host application may determine a reward for the campaign participant based on the campaign participant's level of participation in the marketing campaign, which may be based on the determined number of instances that the campaign participant uses the one or more keywords and/or key phrases in one or more audio file provided to the marketing campaign host application. Optionally, the level of participation may be represented as one or more scores or a composite score. In one example, the host application may calculate a time score for the campaign participant based on an average duration of the audio files received from the campaign participant for the marketing campaign divided by a greatest average duration of audio files received from any other campaign participant for the marketing campaign. In another example, the host application may calculate an occurrence score for the campaign participant based on the determined number of instances that the campaign participant says the identified one or more keywords and/or key phrases in the received audio file. Specifically, the occurrence score for the campaign participant may be a minimum (lowest value) of either two (2) or the quotient of a number of times keywords are mentioned by the participant divided by the maximum number of keywords the user is allowed to say. In yet another example, the host application may calculate a promoter score for the campaign participant based on the time score for the campaign participant divided by the occurrence score for the campaign participant, multiplying the result by 100. In a further example, the host application may determine a total number of other campaign participants that have elected to follow the campaign participant on the social media platform, determine a change in the number of campaign participants that have elected to follow a social media account of the campaign participant in a recent time period, and calculate a social media engagement rate based on the determined change in the total number times 100 divided by a total number of the followers (other participants that are following the campaign participant). In a still further example, the host application may determine a composite score for the campaign participant based on a mathematical sum of a previous day composite score for the campaign participant, a final promoter score for the campaign participant during the current day across all campaigns in which the campaign participant participates, and the social media engagement rate for the campaign participant, wherein the reward for the campaign participant is determined based on the composite score.

In some embodiments, the composite score may further account for a number of instances that the campaign participant posts a certain keyword to social media within the app (visual or textual keyword, as opposed to only accounting for the spoken, verbal or audio keywords from the audio files). For example, the host application may determine a composite score for the campaign participant based on a mathematical sum of the campaign participant's composite score on the previous day, a final promoter score for the campaign participant during the current day across all campaigns in which the campaign participant participates, and the social media engagement rate for the campaign participant. The "final promoter score" is the sum of the first average promoter score (based on spoken keywords in an audio file) and a second/additional average promoter score (based on visual keywords, such as typed words, in a social media post).

In some embodiments, the host application may calculate a post occurrence score (in reference to social media "posts") for the campaign participant based on the determined number of instances that the campaign participant uses the identified one or more keywords and/or key phrases (visual or typed) in social media posts. Specifically, the post occurrence score may be the minimum of either a value of 2 or the value of the determined number of instances of keywords appearing in a social media post within the app by the campaign participant divided by the maximum number of instances of the keywords that the user is supposed to use (as established by the campaign originator). A visual keyword engagement rate may be determined to be equal to a number of "likes" received by the posts containing these visual keywords divided by a total number of followers (users within the app that are following the participant), then multiplied by 100. The host application may also calculate the additional promoter score (for visual keywords in social media posts) for the campaign participant based on the post occurrence score for the campaign participant multiplied by the visual keyword engagement rate for the campaign participant. Where there are multiple unique keywords authorized by the marketing campaign originator, an average promoter score (for visual keywords) may be determined based on a total of all promoter scores across all visual keyworks and across all campaigns in which the user has participated, divided by the total number of active campaigns in which the user has participated. Accordingly, the average promoter score (for visual keywords) may be used in the calculation of the final promoter score in place of the promoter score (for visual keywords).

Each campaign may have multiple visual keywords and the Post Occurrence Score may be calculated for each keyword for each campaign. The Post Occurrence Score is a minimum of either 2 or the result of division between the number of visual keywords posted by the user and maximum no. of visual keywords the participants are allowed to post (per day). The minimum function returns the minimum value in a given list of arguments. Then, the Visual Keyword Engagement Rate is calculated by dividing the total number of followers (other participants that are following the participant), then multiplying the result by 100. Then, the Promoter Score for each visual keyword across campaigns by multiplying the Post Occurrence Score by the Visual Keyword Engagement Rate. Next, the Average Promoter Score for visual keywords is calculated by dividing the Sum of all the Promoter Scores for all keywords across all the campaigns in which the user has participated by the number of campaigns in which the user has participated. It should be emphasized that the term "social media" as used herein refers to social media features that are native to the app provided by the host computing device.

In a further example, the host application may determine a total number of other campaign participants that have elected to follow the campaign participant on the native social media platform, determine a change in the number of campaign participants that have elected to follow the campaign participant on the native social media platform in a recent time period, and calculate a social media engagement rate based on the determined change in the total number times 100 divided by the determined total number. In a still further example, the host application may determine a composite score for the campaign participant based on a mathematical sum of the campaign participant's previous day composite score, the Final Promoter Score for the day, and the social media engagement rate for the campaign participant, wherein the reward for the campaign participant is determined based on the composite score.

In some embodiments, a campaign participant may be rewarded with coupons or other similar benefits based upon one or more score, such as a composite score. A campaign participant may, for example, accumulate composite scores or points across one or more days, one or more campaigns, and/or one or more mobile devices. The composite score for a campaign participant may be converted to one or more rewards using a predetermined conversion rate or using a ratio of the campaign participant's composite score to the composite score of others participating in a given campaign.

In some embodiments, the composite score may be calculated for a campaign participant and may be converted into a reward that is provided to the campaign participant. For example, a composite score may be calculated for a campaign participant in response to the occurrence of an event or expiration of a given time period during a campaign, such as at the end of each day during a campaign or when a particular campaign has ended. A composite score may be calculated for each campaign participant that participates in the campaign based upon the participant's use of the keywords, either spoken or textual, in the mobile application running on the campaign participants' computing devices.

In some embodiments, each campaign participant may form an account within the marketing campaign host application for the receipt of identified rewards for promotional activities in support of one or more marketing campaign. Embodiments may also provide a manner for exchanging the rewards for some other type of benefit, product or service. In one option, each campaign participant may provide their bank account or credit card account information to the host application such that earned rewards may be directly deposited into the account associated with the provided account information.

In some embodiments, the marketing campaign data received from the campaign originator may further identify one or more rewards offered by the campaigning entity, and the reward for the campaign participant is selected from the identified one or more rewards. Optionally, the identified one or more rewards are based on the campaign participant's level of participation, which may be represented by a score such as the composite score. Furthermore, the rewards given to a campaign participant may be determined for each marketing campaign in which they participate or may be determined collectively for all of the marketing campaigns in which they participate.

In some embodiments, the marketing campaign data identifies one or more rewards offered by the campaigning entity, and the reward identified for the campaign participant is based on the one or more identified rewards and a ratio of the composite score earned by the campaign participant and the total of composite scores earned by other campaign participants that are participating in the marketing campaign.

In some embodiments, the marketing campaign data received from the campaign originator provides a maximum limit on the number of instances of the identified one or more keywords and/or key phrases that may be counted from a single audio file. For example, if the maximum limit is six instances, then any further instances of the one or more keywords and/or key phrases with a given audio file are not counted toward calculating a score or earning a reward. Specifically, for each received audio file, the determined number of instances that the campaign participant says the identified one or more keywords and/or key phrases in the received audio file may be capped at the maximum limit prior to calculating the occurrence score or any other score.

In some embodiments, a composite score representing a level of participation for the campaign participant may be determined in response to an event selected from an end of a day, a prescheduled deadline, and an end to the marketing campaign. For example, a first composite score may be determined for the campaign participant at the end of each day for a first marketing campaign, and a second composite score may be determined for the campaign participant at the end of a second marketing campaign.

Some embodiments include a computer program product comprising a non-volatile computer readable medium and non-transitory program instructions embodied therein, where the program instructions are configured to be executable by a processor to cause the processor to perform various operations. The operations may include receiving marketing campaign data over a network from a plurality of campaign originator computing devices to establish a plurality of marketing campaigns, wherein the marketing campaign data for each marketing campaign identifies one or more keywords and/or key phrases that are targeted by the marketing campaign. The operations may further include causing the marketing campaign data from the plurality of marketing campaigns to be accessible over a wide area network to a plurality of campaign participant computing devices and registering each of the campaign participant computing devices with at least one of the marketing campaigns. Still further, the operations may include receiving one or more audio file over the wide area network from the plurality of campaign participant computing devices, wherein, for each audio received file from one or the plurality of campaign participant computing devices, the audio file includes spoken words of the campaign participant recorded by a microphone on the campaign participant computing device. After determining, for each audio file received from one or the plurality of campaign participant computing devices, a number of instances that the campaign participant says the identified one or more keywords and/or key phrases, the operations may include identifying a reward for each campaign participant based on the determined number of instances and crediting an account of the campaign participant with the identified reward.

Some embodiments provide a computer-implemented method that includes various steps or operations. The steps or operations may include receiving marketing campaign data over a network from a campaign originator computing device to establish a marketing campaign, wherein the marketing campaign data identifies one or more keywords and/or key phrases that are targeted by the marketing campaign. The steps or operations may further include causing the marketing campaign data to be accessible over a wide area network to a campaign participant computing device and receiving one or more audio file over the wide area network from the campaign participant computing device, wherein each received audio file includes spoken words of the campaign participant recorded by a microphone on the campaign participant computing device. The steps or operations may additionally include determining, for each received audio file, a number of instances that the campaign participant says the identified one or more keywords and/or key phrases in the received audio file, identifying a reward for the campaign participant based on the determined number of instances, and crediting an account of the campaign participant with the identified reward.

Some embodiments provide a marketing campaign originator application in the form of a computer program product comprising a non-volatile computer readable medium and non-transitory program instructions embodied therein, where the program instructions are configured to be executable by a processor to cause the processor to perform various operations. The marketing campaign originator application may be executed on a marketing campaign originator computing device, such as a desktop computer. The marketing campaign originator application may facilitate signing up for an account with the host application and starting a marketing campaign. The operations may include receiving marketing campaign data input for establishing a marketing campaign, such as keywords and/or key phrases, maximum counts within an audio file, and/or rewards for participants. Further operations may include transmitting the marketing campaign data over a network to the host application. Still other operations may include campaign monitoring and management. The marketing campaign originator application may interface with the host application via a web portal. A campaign originator may be an individual, business, non-profit corporation, civic organization, governmental entity, sponsor group, or other entities interested in spreading information about a product, service, activity, event, charity, and the like.

Some embodiments provide a marketing campaign participant application, which may be optimized for use by a mobile computing device such as a smartphone, smart speaker or wearable. Non-limiting examples of a mobile version of the marketing campaign participant application may be compatible with mobile smartphones that use the iOS or Android operating systems. An individual ("campaign participant") that desires to participate in promoting a product or service in exchange for rewards may download the mobile application to their mobile computing device. During an initial registration process, the mobile application may ask the campaign participant to accept terms of service and a privacy policy and may request additional input to setup an account for the campaign participant. The mobile application may explicitly prompt the campaign participant to allow permission to record audio of their conversations. For example, the campaign participant may give permission for the mobile application to record audio in the foreground (i.e., when the application is the active application on their mobile computing device), give permission for the mobile application to record audio in background (i.e., when the application is not the active application on their mobile computing device), and/or give permission for the mobile application to record audio when the mobile computing device is locked.

In some embodiments, the campaign participant may use the marketing campaign participant application to sign up for an account and select passions of their choice from a list made available to them. Based on the passions selected by the campaign participant, the mobile application may display one or more campaigns for the campaign participant to review. The campaign participant may also review the one or more campaigns and selected whether to participate in any of the one or more campaigns.

In some embodiments, the marketing campaign participant application allows a campaign participant to record their conversations and upload the resulting audio files or other data structure to the host application for audio processing. As a result of promoting the subject of the marketing campaign such as a product or service, the campaign participant may be rewarded with coupons or other similar benefits.

In some embodiments, the campaign participant may cause the marketing campaign participant application to begin recording the campaign participant's conversations. Such conversations may, for example, include promotion of the product or service that is the subject of a marketing campaign selected by the participant. Promotion may include mentioning the product or service, describing a feature or benefit of the product or service, and/or expressing a positive sentiment about the product or service. The audio file or recording of the conversation is uploaded to the host application computing device, where audio processing may be performed.

In some embodiments, the participant application may prompt or remind a campaign participant that audio recording has continued for some predetermined duration (i.e., period of time). For example, the participant application may generate a notification to be output on the mobile computing device of the campaign participant upon expiration of the predetermined duration since audio recording was initiated. Such a notification may provide the campaign participant with awareness that audio recording has continued and prompt the campaign participant to stop the audio recording if they so choose. In one option, if the user does not take any steps to stop or continue the continued audio recording, such as if the campaign participant does not acknowledge the notification, then the mobile application may automatically stop the audio recording after some second predetermined duration.

In some embodiments, the participant application may continue recording audio of the campaign participant's conversations, in accordance with the participant's instructions, even if the mobile computing device becomes disconnected from the Internet while recording is in progress. Accordingly, the participant application may store one or more audio recording on a local data storage component of the participant computing device. The participant application may upload the one or more audio recordings to the host computing system at a later time when the participant computing device has reconnected with the network such as the Internet. In one option, the participant application may send an audio file to the host computing system in chunks while recording is in progress.

In some embodiments, the participant application may allow a campaign participant to delete all or part of one or more instance of an audio file or recording that was obtained via their computing device. In one option, the campaign participant may be allowed to permanently delete a selected audio recording (file or fragment) and/or determine whether the selected audio recording should be deleted from the campaign participant's computing device and/or the host computing system.

The participant application may also include a social community feature in which any campaign participant with an account may follow another campaign participant with an account. A campaign participant or other user (a "follower") that follows another campaign participant will receive updates about the activities of the followed campaign participant. As used herein, a first campaign participant or other user that "follows" a second campaign participant may be referred to as a "follower" of the second campaign participant. As more and more individuals and/or participants follow the second campaign participant, the second campaign participant may have any number of followers and the system may track the number of followers of the second participant. The number of followers associated with a campaign participant may be used in determining a composite Score for that campaign participant.

Some embodiments provide a technical benefit of utilizing audio files of actual voice recordings as input that a marketing campaign host system can utilize to quantify the promotional activity of a participant in a real-world situation, such as conversations with other people. A further technical benefit of various embodiments is that the system enables people to use their computing device, such as a smartphone, to register as participants in a marketing campaign and upload conversations that can be used as quantifiable evidence of their promotional activities supporting the marketing campaign. Embodiment may leverage speech-to-text, natural language processing, and/or key phrase extraction to enable a digital marketing platform that leverages word-of-mouth marketing when a participant's interests in a particular product or service, or their attitude toward the particular product or service, is reflected in their day-to-day conversations.

Embodiments of the computer-implemented method may include any of the operations described herein in the context of embodiments of a computer program product or embodiments of a system. Similarly, embodiments of the computer program products and/or system may further include any one or more of the steps or operations of the computer-implemented methods described herein. Furthermore, some embodiments may be directed to a system or apparatus including at least one non-volatile storage device storing program instructions and at least one processor configured to process the program instructions, wherein the program instructions are configured to, when processed by the at least one processor, cause the apparatus to perform various operations as described in reference to one of the computer program products and/or the computer-implemented methods.

Some embodiments may determine a composite score based solely on a participant's use of spoken keywords as evidenced by audio files or streaming audio, determine a composite score based solely on a participant's use of visual (textual) keywords as evidenced in social media posts, or determine a composite score based on a participant's use of both spoken keywords and visual keywords. Accordingly, embodiments of the computer program products and computer-implemented methods, whether directed to the marketing campaign host application, the marketing campaign originator application and/or the marketing campaign participant application, may involve data collection and/or intermediate or final score calculations in support of determining a composite score based solely on a participant's use of spoken keywords as evidenced by audio files or streaming audio, determine a composite score based solely on a participant's use of visual (textual) keywords as evidenced in social media posts, or determine a composite score based on a participant's use of both spoken keywords and visual keywords.

Figure 1:
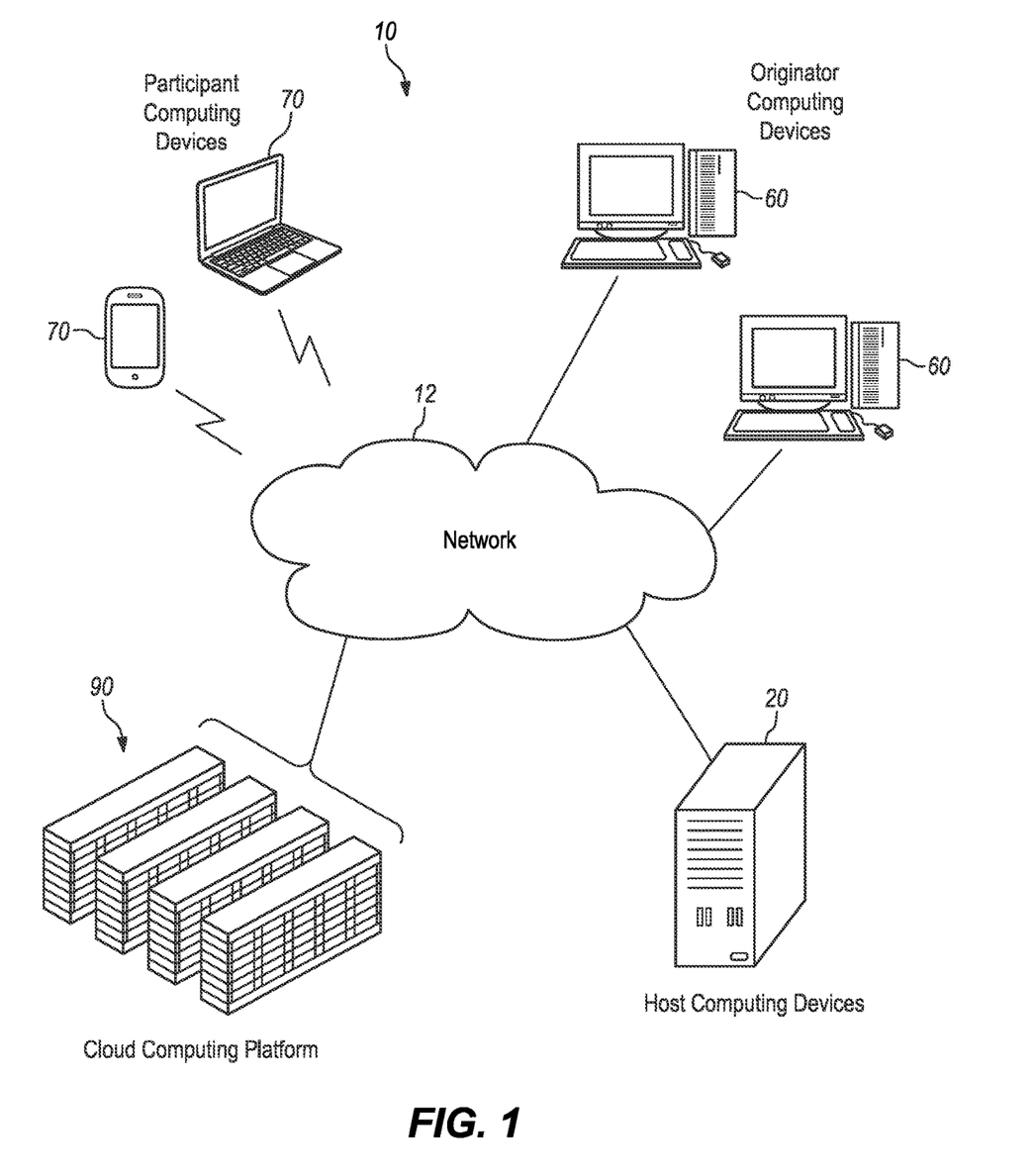
FIG. 1 is a diagram of a system including a plurality of mobile computing devices that communicate with a host computing device, such as an application server.

FIG. 1 is a diagram of a system 10 including host computing device 20 that is accessible over a network 12 and runs a marketing campaign host application. The system further includes a plurality of originator computing devices 60 and a plurality of participant computing devices 70 that communicate over a network 12 with the host computing device 20, such as an application server. The originator computing devices 60 may run a marketing campaign originator application that interfaces with the marketing campaign host application. The participant computing devices 70 may run a marketing campaign participant application that also interfaces with the marketing campaign host application. The system may also include, or utilize, a cloud computing platform or service 90 that is also accessible over the network, such as the Internet. The host application may use various cloud computing services available on the cloud computing platform 90 to support various operations.

Figure 2:
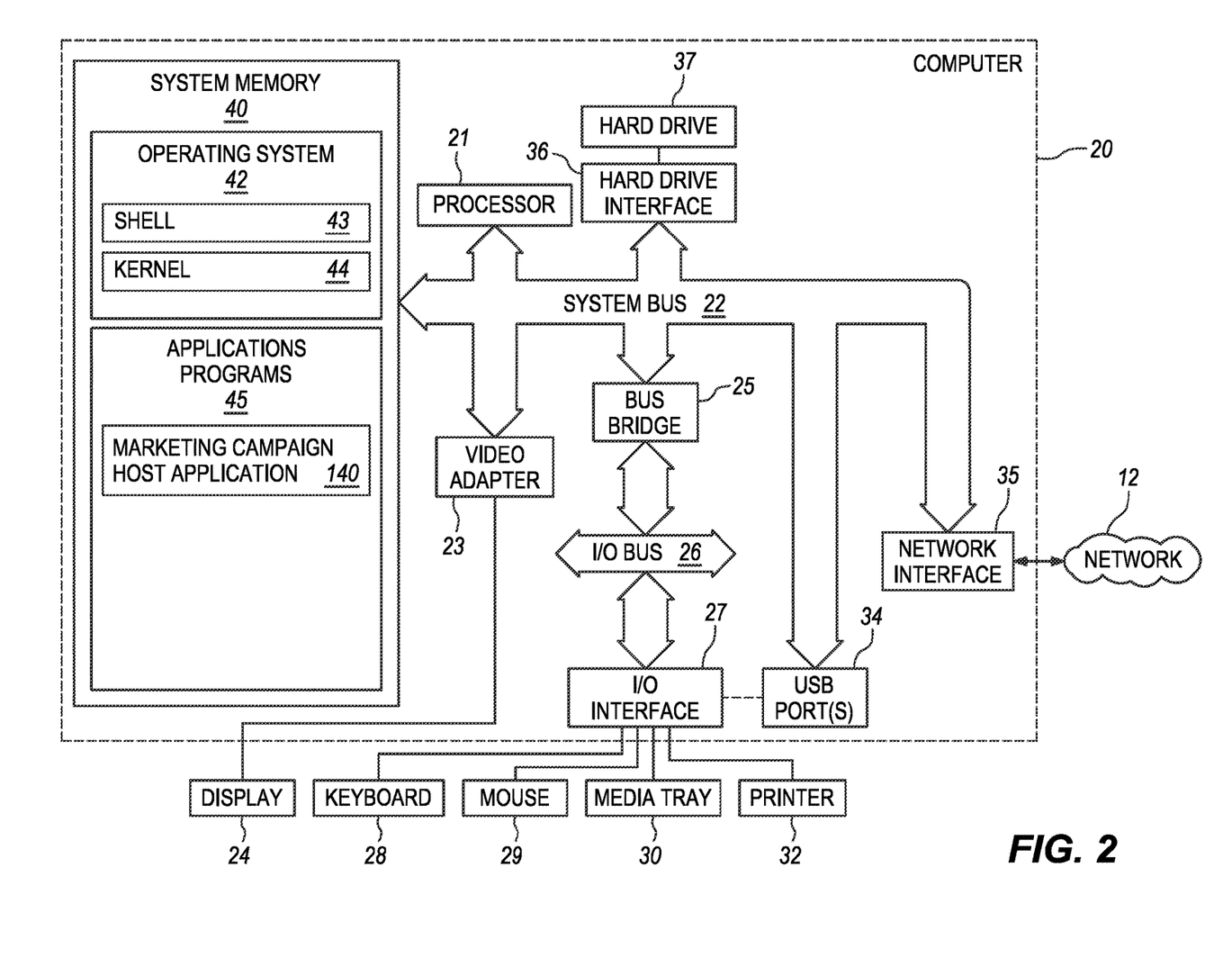
FIG. 2 is a diagram of the host computing device.

FIG. 2 is a diagram of a host computing device 20 that may be used in the computing system 10 of FIG. 1. Furthermore, the architecture and components of the host computing device 20 may be representative of a computer that may implement one or more of the originator computing devices 60, the participant computing devices 70 and a server in the cloud computing system 90. However, none of the computing devices 20, 60, 70, 90 are limited to the architecture and components shown.

The host computing device 20 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and provides communication with various I/O devices, including a keyboard 28, a mouse 29, a media tray 30 (which may include storage devices such as CD-ROM drives, multi-media interfaces, etc.), a printer 32, and USB port(s) 34. As shown, the computer 20 is able to communicate with other network devices, such as the campaign originator computing devices 60 (see FIG. 1), the participant computing devices 70 (see FIG. 1) and the cloud computing platform 90 (see FIG. 1) via the network 12 using a network adapter or network interface controller 35. The network interface 35 may also allow the computing device 20 to access social media providers and other external resources.

A hard drive interface 36 is also coupled to the system bus 22 and interfaces with a hard drive 37. The hard drive 37 may store a copy of an operating system and application programs so that they can be loaded into memory upon startup of the computer 20. In a preferred embodiment, the hard drive 37 communicates with system memory 40, which is also coupled to the system bus 22. System memory includes the lowest level of volatile memory in the computer 20. This volatile memory may include additional higher levels of volatile memory (not shown), including, but not limited to, cache memory, registers and buffers. Data that populates the system memory 40 includes the operating system (OS) 42 and application programs 45.

The operating system 42 includes a shell 43 for providing transparent user access to resources such as application programs 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 may be a text-based, line-oriented user interface, embodiments will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs 45, including memory management, process and task management, disk management, and mouse and keyboard management. The application programs 45 in the system memory of the computer 20 may include, without limitation, a marketing campaign host application 140. Should the same architecture be used for one of the originator computing devices 60, then the application programs 45 may include a marketing campaign originator application. Should the same architecture be used for one of the participant computing devices 70, then the application programs 45 may include a marketing campaign participant application. Should the same architecture be used for one of the servers in the cloud computing system 90, then the application programs 45 may include a speech-to-text application, a natural language processing application, and/or a key phrase extraction application.

The hardware elements depicted in the computing device 20 are not intended to be exhaustive, but rather are representative. For instance, the computing device 20 may include alternate memory storage devices such as magnetic cassettes, digital versatile disks (DVDs), Bernoulli cartridges, and the like. These and other variations are intended to be within the scope of the embodiments.

Figure 3:
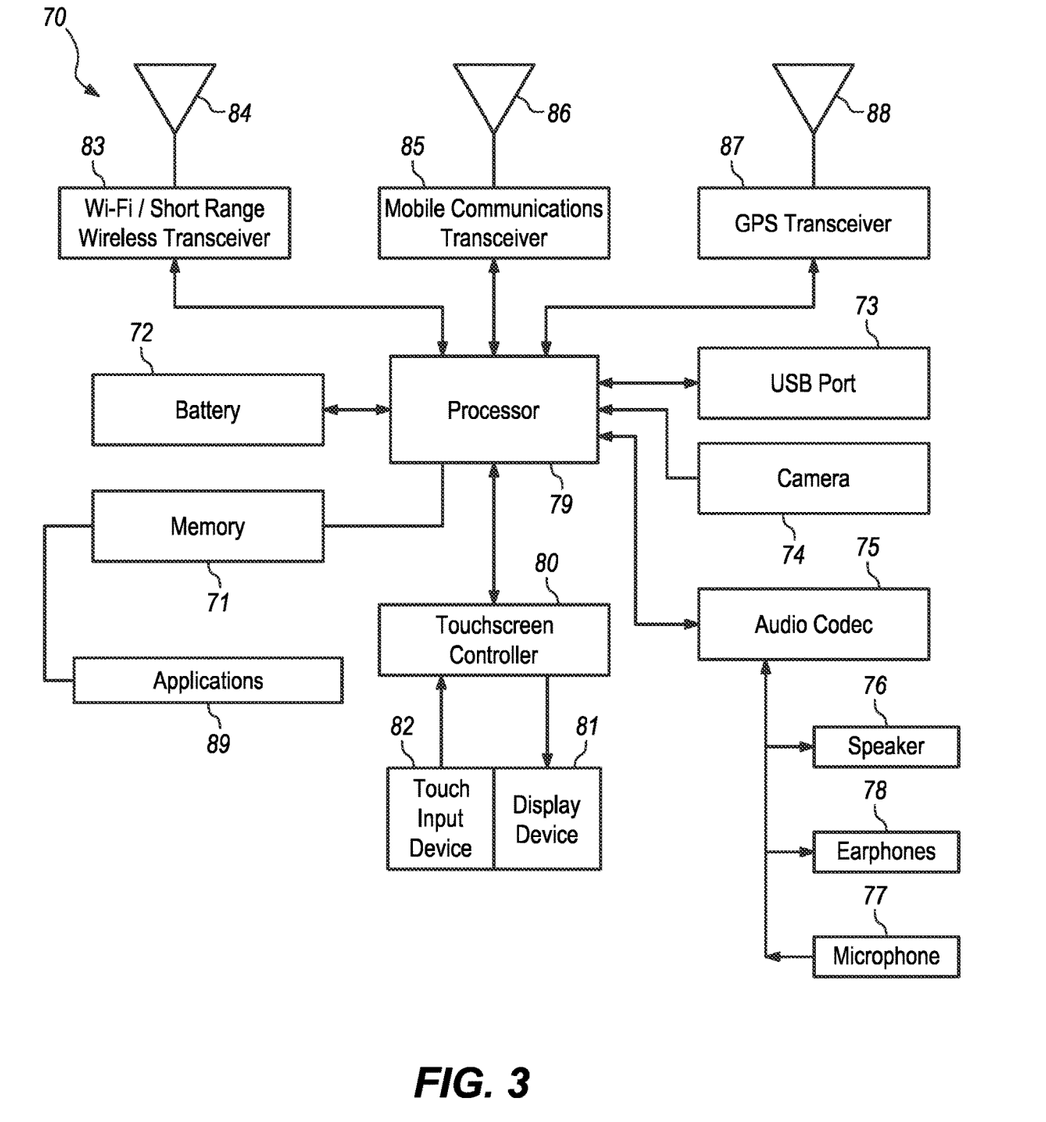
FIG. 3 is a diagram of a mobile computing device, such as a smartphone.

FIG. 3 is a diagram of a participant computing device 70, such as a mobile smart phone, that may be used to participate in a marketing campaign according to various embodiments. The computing device 70 may include a processor 79, memory 71, a battery 72, a universal serial bus (USB) port 73, a camera 74, and an audio codec 75 coupled to a built-in speaker 76, a microphone 77, and an earphone jack 78. The communication device 10 may further include a touchscreen controller 80 which provides a graphical output to the display device 81 and an input from a touch input device 82. Collectively, the display device 81 and touch input device 82 may be referred to as a touchscreen.

The computing device 70 may also include a Wi-Fi™ and/or Bluetooth™ transceiver 83 and corresponding antenna 84, a mobile communication transceiver 85 and corresponding antenna 86, and/or a global positioning system (GPS) transceiver 87 and corresponding antenna 88. Accordingly, the Wi-Fi™ transceiver 83 enables communication between the computing device 70 and a wireless network access point. In order to implement one or more embodiment, the memory 71 may store one or more applications 89, such as an "app" for causing the participant computing device 70 to perform one or more steps or operations of a marketing campaign participant application according to one or more embodiments. The architecture of the computing device 70 could also be representative of a campaign originator device, wherein the one or more applications 89 may be an "app" for causing the computing device 70 to perform one or more steps or operations of a marketing campaign originator application according to one or more embodiments.

Figure 4:
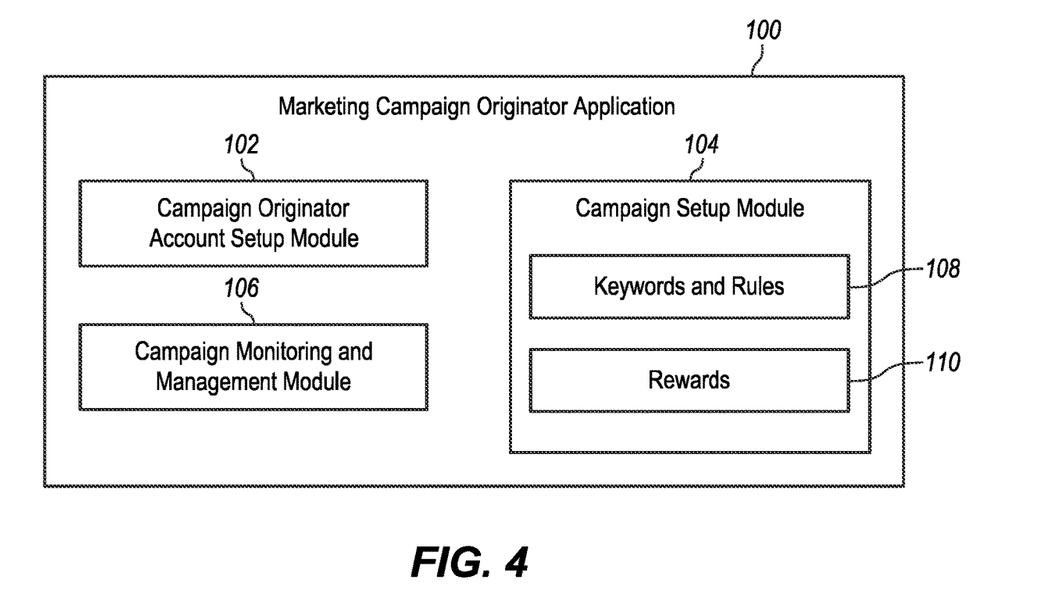
FIG. 4 is a diagram of a marketing campaign origination application that may be executed by a computing device of a marketing campaign originator.

FIG. 4 is a diagram of a marketing campaign originator application 100 that may be executed by a marketing campaign originator computing device 60 (see FIG. 1) of a marketing campaign originator. The illustrated embodiments of a marketing campaign originator application 100 includes a campaign originator account setup module 102, a campaign setup module 104, and a campaign monitoring and management module 106. The campaign setup module 104 may further include the keywords and rules 108 as well as the rewards 110 associated with a marketing campaign that is setup by the marketing campaign originator, such as an individual, business or organization. The modules 102, 104, 106 and any other modules may be used to cause the marketing campaign originator computing device 60 to perform the operations of the marketing campaign originator application 100 according to one or more embodiment disclosed herein.

Figure 5:
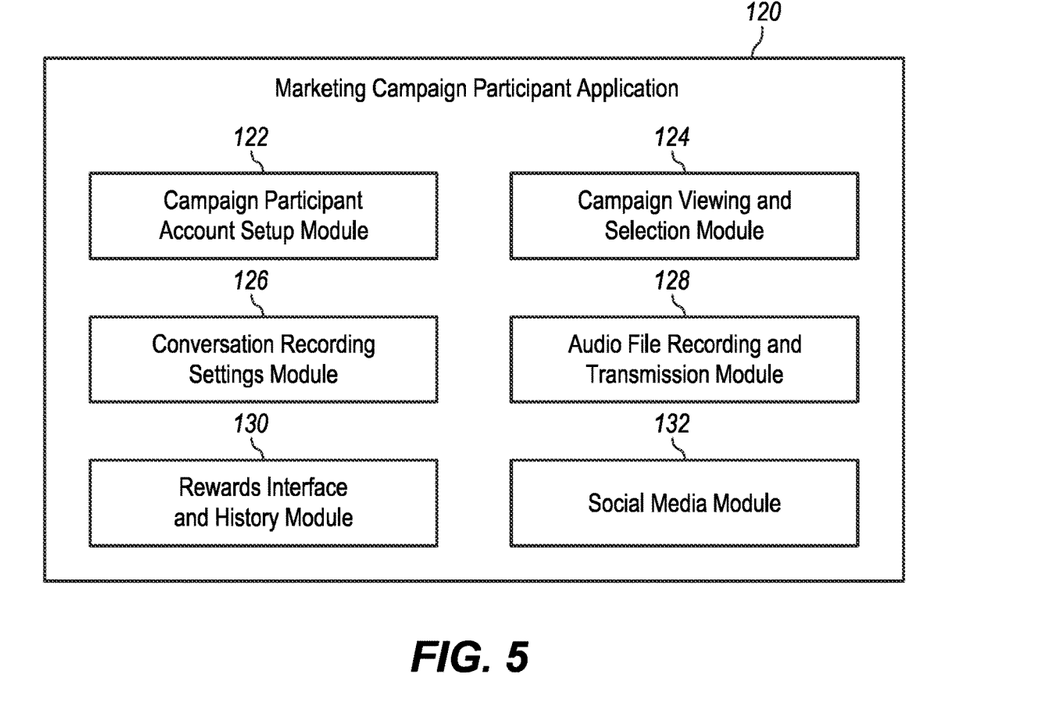
FIG. 5 is a diagram of a marketing campaign participant application that may be executed by a computing device of a campaign participant or marketing campaign participant.

FIG. 5 is a diagram of a marketing campaign participant application 120 that may be executed by a marketing campaign participant computing device 70 (see FIG. 1) of marketing campaign participant. The illustrated embodiments of a marketing campaign participant application 120 includes a campaign participant account setup module 122, a campaign viewing and selection module 124, a conversation recording settings module 126, an audio file recording and transmission module 128, a rewards interface and history module 130, and a social media module 132. The modules 122, 124, 126, 128, 130, 132 and any other modules may be used to cause the marketing campaign participant computing device 70 to perform the operations of the marketing campaign participant application 120 according to one or more embodiment disclosed herein. For example, the audio file recording and transmission module 128 may collect the spoken or verbal keyword input that is used to calculate the promoter score, and the social media module 132 may collect the visual or textual keyword input that is used to calculate the promoter score (visual keywords).

Figure 6:
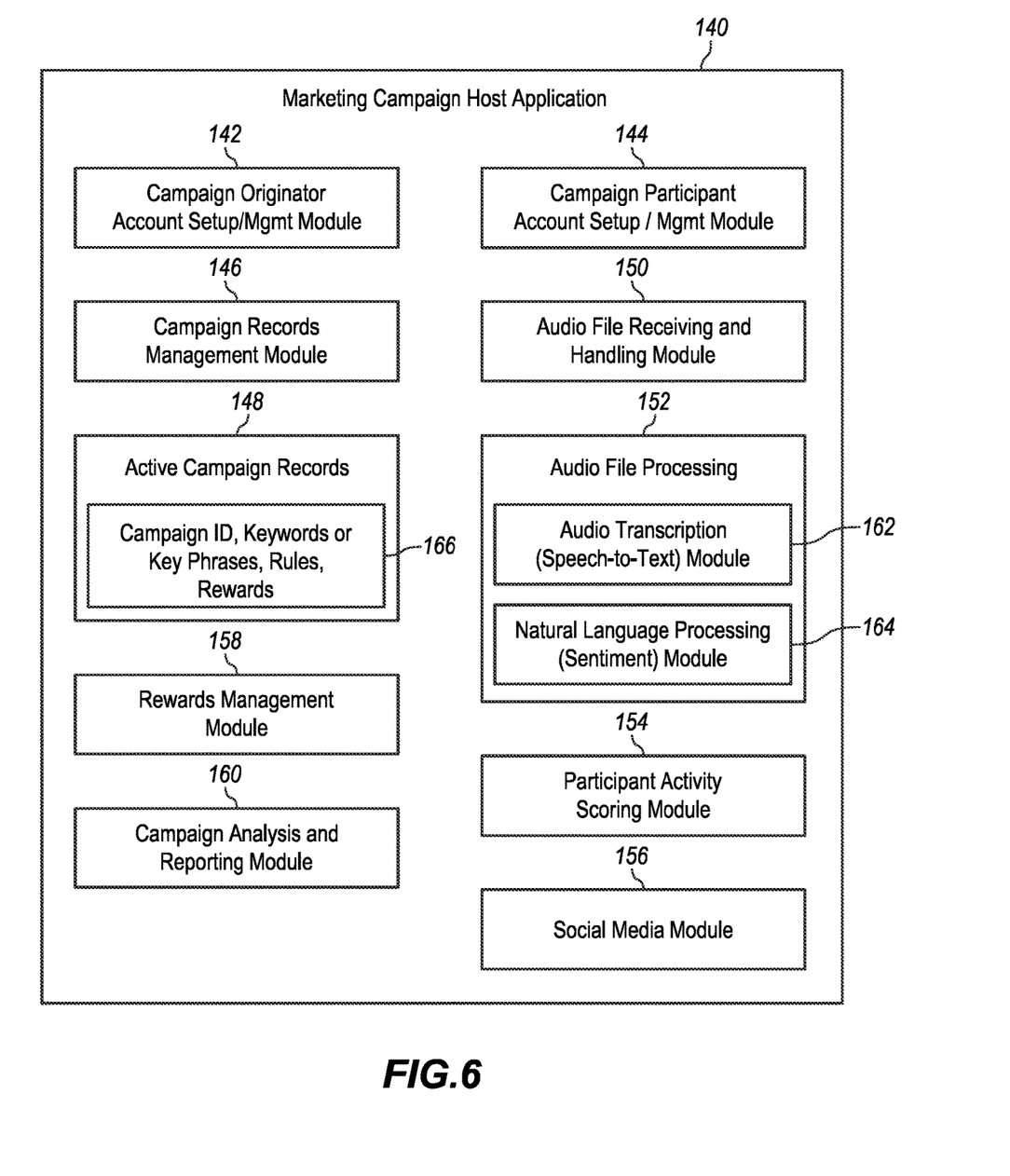
FIG. 6 is a diagram of a marketing campaign host application that may be executed by an application server of a marketing campaign host.

FIG. 6 is a diagram of a marketing campaign host application 140 that may be executed by a marketing campaign host computing device 20 (see FIG. 1). The illustrated embodiments of a marketing campaign host application 140 includes a campaign originator account setup/management module 142, a campaign participant account setup/management module 144, a campaign records management module 146, active campaign records 148, an audio file receiving and handling module 150, an audio file processing module 152, a participant activity scoring module 154, a social media module 156, a rewards management module 158, and a campaign analysis and reporting module 160. As shown, the audio file processing module 152 may include an audio transcription (speech-to-text) module 162 and a natural language processing (sentiment) module 164, which may include functionality for key phrase extraction. One or more function of the audio file processing 152 and/or other functions of the marketing campaign host application 140 may interface with a cloud computing platform that performs some or all of the necessary functions for the host application 140. Furthermore, the active campaign records 148 may include records 166 that include a campaign identifier, one or more keywords and/or key phrases, various rules (such as a maximum count), and rewards.

The social media module 156 of the host application provides a social media platform that may be accessed and used by each marketing campaign originator application 100 and each marketing campaign participant application 120. Furthermore, to the extent that other user categories are enabled, all users of the app are allowed to access and use the social media platform within the app whether or not they have originated a marketing campaign and/or participated in the marketing campaign.

In one non-limiting example, the following calculations may be performed by the participant activity scoring module 154 using output from the audio file processing module 152 and output from the social media module 156. Accordingly, one specific composite score for a particular participant of a particular marketing campaign during a time period of one day may be calculated. The composite score may be calculated at the end of each day, such as at midnight Central Standard Time (CST) each day. In the formulas below and the description of the formulas, reference to one or more campaign means the campaign(s) that are active on that day and in which the user has participated. The formulas do not consider campaigns that have expired or active campaigns in which the user has not participated. Furthermore, the social media referred to in the formulas refers to the social media community of users interacting with the social media platform supported by the host application. A first user of the app that follows a second user of the app becomes part of the second user's social community. Accordingly, the embodiments do not involve engagement with outside social media platforms. The composite score may be calculated as follows:

> Time Score=Average duration of recording on a campaign/Average duration of recording spent by user who has highest recording duration > Occurrence Score=Minimum of (2,(#times keywords mentioned by user/max #keywords user is supposed to say))

> Promoter Score (Spoken Keyword)=(Time Score/Occurrence Score)*100

> Social Media Engagement Rate=(Change in followers in a day/Total followers count on that day) *100

> Composite Score (for a Day)=Previous day composite score+Final Promoter Score for the day+ Social Media Engagement Rate In another non-limiting example, the following calculations may be performed by the participant activity scoring module 154 using data from the audio file processing module 152 and data from the social media module 156. Accordingly, one specific composite score for a particular participant of a particular marketing campaign during a time period of one day may be calculated as follows:

Spoken Keywords (Audio Files)

Time Score=Average length of recording on a campaign/Average length of recording of the user who has highest recording time Occurrence Score=Minimum of (2,(#times keywords mentioned by user/max #keywords user is supposed to say)

Promoter Score (Spoken Keyword)=(Time Score/Occurrence Score)*100

Average Promoter Score (Spoken Keyword)=Sum of Promoter Score across all active campaigns in which the user has participated/Total no. of active campaigns in which the user has participated Visual Keywords (Social Media Posts)

Post Occurrence Score=Minimum of (2,(#times visual keywords posted by user/max #keywords user is supposed to posts)

Visual Keyword Engagement Rate=(number of Likes (i.e., positive sentiments responses) on a post/Total Followers)*100

Promoter Score (Visual Keyword)=(Post Occurrence Score*Visual Keyword Engagement Rate)

Average Promoter Score (Visual Keyword)=Sum of all Promoter Scores (Visual Keyword) across all active campaigns in which the user has participated/Total number of active campaigns in which the user has participated.

Combined Scoring

Final Promoter Score=Average Promoter Score (Spoken Keyword)+Average Promoter Score (Visual Keyword)

Social Media Engagement

Social Media Engagement Rate=(Change in the participant's followers in a day/Total of participant's followers count at the end of that day) *100

Composite Score

Composite Score (for a Day)=Previous day composite score+Final Promoter Score for the day across campaigns+Social Media Engagement Rate As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   receiving marketing campaign data over a network from a campaign originator computing device to establish a marketing campaign, wherein the marketing campaign data identifies one or more keywords and/or key phrases that are targeted by the marketing campaign;
   causing the marketing campaign data to be accessible over a wide area network to a campaign participant computing device;
   receiving one or more audio file over the wide area network from the campaign participant computing device, wherein each received audio file includes spoken words of the campaign participant recorded by a microphone on the campaign participant computing device;
   determining, for each received audio file, a number of instances that the campaign participant says the identified one or more keywords and/or key phrases in the received audio file;
   calculating an occurrence score based on the determined number of instances that the campaign participant says the identified one or more keywords and/or key phrases in the received audio file;
   identifying a reward for the campaign participant based on at least one of the determined number of instances and the occurrence score; and
   crediting an account of the campaign participant with the identified reward.

2. The computer program product of claim 1, wherein determining, for each received audio file, a number of instances that the campaign participant says the identified one or more keywords and/or key phrases in the received audio file includes:
   translating the spoken words in each audio file into text; and
   counting the number of instances of the one or more keywords and/or key phrases in the text.

3. The computer program product of claim 2, the operations further comprising:
   using natural language processing to determine a sentiment indicator that identifies whether the text in the text file indicates that the campaign participant expressed positive or negative sentiment regarding each instance of the one or more keywords and/or key phrases in the text, wherein each instance of the one or more keywords and/or key phrases in the text is counted only if the instance is associated with a positive sentiment indicator.

4. The computer program product of claim 1, the operations further comprising:
   sending the one or more audio file over the wide area network to an application programming interface for a speech-to-text transcription service of a cloud computing platform; and
   receiving a text file over the wide area network from the cloud computing platform, wherein the text file includes the text transcribed from the audio file.

5. The computer program product of claim 4, the operations further comprising:
   sending the text file over the wide area network to an application programming interface for a natural language processing service of a cloud computing platform; and
   receiving a sentiment indicator over the wide area network from the cloud computing platform, wherein the sentiment indicator identifies whether the text in the text file indicates that the campaign participant expressed positive or negative sentiment regarding the instances of the one or more keywords and/or key phrases.

6. The computer program product of claim 1, wherein the one or more keywords and/or key phrases describe a name, feature or characteristic of a product or service that is a subject of the marketing campaign.

7. The computer program product of claim 1, wherein the one or more audio file is received over the wide area network from the campaign participant computing device in a series of chunks.

8. A computer program product comprising a non-volatile computer readable medium and non-transitory program instructions embodied therein, the program instructions being configured to be executable by a processor to cause the processor to perform operations comprising:

receiving marketing campaign data over a network from a campaign originator computing device to establish a marketing campaign, wherein the marketing campaign data identifies one or more keywords and/or key phrases that are targeted by the marketing campaign;

causing the marketing campaign data to be accessible over a wide area network to a campaign participant computing device;

receiving one or more audio file over the wide area network from the campaign participant computing device, wherein each received audio file includes spoken words of the campaign participant recorded by a microphone on the campaign participant computing device;

calculating a time score for the campaign participant based on an average duration of the audio files received from the campaign participant for the marketing campaign divided by a greatest average duration of audio files received from any other campaign participant for the marketing campaign;

determining, for each received audio file, a number of instances that the campaign participant says the identified one or more keywords and/or key phrases in the received audio file;

calculating an occurrence score for the campaign participant based on a minimum value of either two or the quotient of the determined number of instances that the campaign participant says the identified one or more keywords and/or key phrases in the received audio file divided by a maximum number of times that the campaign originator allows the campaign participant to use the one or more keywords and/or key phrases;

calculating a promoter score for the campaign participant based on the time score for the campaign participant divided by the occurrence score for the campaign participant;

determining a total number of other campaign participants that have elected to follow the campaign participant on one or more social media platform;

determining a change in the number of campaign participants that have elected to follow a social media account of the campaign participant in a recent time period;

calculating a social media engagement rate based on the determined change in the total number times 100 divided by the determined total number;

determining a composite score for the campaign participant based on a mathematical sum of the campaign participant's previous day composite score, an average of the promoter score for the campaign participant during the current day across all campaigns in which the campaign participant participates, and the social media engagement rate for the campaign participant;

identifying a reward for the campaign participant based on the composite score; and crediting an account of the campaign participant with the identified reward.

9. The computer program product of claim 8, wherein the marketing campaign data further identifies one or more rewards offered by the campaigning entity, and wherein the reward for the campaign participant is selected from the identified one or more rewards based on the composite score.

10. The computer program product of claim 8, wherein the marketing campaign data received from the campaign originator provides a maximum limit on the number of instances of the identified one or more keywords and/or key phrases that may be counted from a single audio file, the operations further comprising:

capping, for each received audio file, the determined number of instances that the campaign participant says the identified one or more keywords and/or key phrases in the received audio file at the maximum limit prior to calculating the occurrence score.

11. The computer program product of claim 8, wherein the composite score for the campaign participant is determined in response to an event selected from an end of a day, a prescheduled deadline, and an end to the marketing campaign.

12. The computer program product of claim 11, wherein the marketing campaign data further identifies one or more rewards offered by the campaigning entity, and wherein the reward identified for the campaign participant is based on the one or more identified rewards and a ratio of the composite score earned by the campaign participant and the total of composite scores earned by other campaign participants that are participating in the marketing campaign.

13. The computer program product of claim 8, the operations further comprising:

calculating a post occurrence score for the campaign participant based on a number of instances that the campaign participant uses the identified one or more keywords and/or key phrases in social media posts;

calculating a visual keyword engagement rate based on a number of "likes" received by the posts of the campaign participant that contain a visual instance of the one or more keywords and/or key phrases divided by a total number of followers that are following the campaign participant;

calculating a promoter score for visual keywords in social media posts for the campaign participant based on the post occurrence score for the campaign participant multiplied by the visual keyword engagement rate for the campaign participant; and calculating a final promoter score based on a sum of an average promoter score for spoken keywords and an average promoter score for visual keywords, wherein the composite score for the campaign participant is based on a mathematical sum of the campaign participant's previous day composite score, the final promoter score for the campaign participant, and the social media engagement rate for the campaign participant.

14. The computer program product of claim 13, wherein the one or more keywords and/or key phrases that are targeted by the marketing campaign include a plurality of keywords and/or key phrases that are targeted by the by the marketing campaign, and wherein the promoter score for visual keywords is an average promoter score for visual keywords that is determined based on a total of all promoter scores across all visual keywords and across all campaigns in which the user has participated, divided by the total number of active campaigns in which the user has participated.

15. The computer program product 13, wherein the post occurrence score is the minimum of either a value of 2 or a quotient of a number of instances of the one or more keywords and/or key phrases appearing in a social media post by the campaign participant divided by the maximum number of instances of the one or more keywords and/or key phrases set by the campaign originator.

16. A computer program product comprising a non-volatile computer readable medium and non-transitory program instructions embodied therein, the program instructions being configured to be executable by a processor to cause the processor to perform operations comprising:
receiving marketing campaign data over a network from a plurality of campaign originator computing devices to establish a plurality of marketing campaigns, wherein the marketing campaign data for each marketing campaign identifies one or more keywords and/or key phrases that are targeted by the marketing campaign;
causing the marketing campaign data from the plurality of marketing campaigns to be accessible over a wide area network to a plurality of campaign participant computing devices;
registering each of the campaign participant computing devices with at least one of the marketing campaigns;
receiving one or more audio file over the wide area network from the plurality of campaign participant computing devices, wherein, for each audio received file from one or the plurality of campaign participant computing devices, the audio file includes spoken words of the campaign participant recorded by a microphone on the campaign participant computing device;
determining, for each audio file received from one or the plurality of campaign participant computing devices, a number of instances that the campaign participant says the identified one or more keywords and/or key phrases;
calculating an occurrence score based on the determined number of instances that the campaign participant says the identified one or more keywords and/or key phrases in the each received audio file;
identifying a reward for each campaign participant based on at least one of the determined number of instances and the occurrence score; and
crediting an account of the campaign participant with the identified reward.

17. A computer-implemented method, comprising:
receiving marketing campaign data over a network from a campaign originator computing device to establish a marketing campaign, wherein the marketing campaign data identifies one or more keywords and/or key phrases that are targeted by the marketing campaign;
causing the marketing campaign data to be accessible over a wide area network to a campaign participant computing device;
receiving one or more audio file over the wide area network from the campaign participant computing device, wherein each received audio file includes spoken words of the campaign participant recorded by a microphone on the campaign participant computing device;
determining, for each received audio file, a number of instances that the campaign participant says the identified one or more keywords and/or key phrases in the received audio file;
calculating an occurrence score based on the determined number of instances that the campaign participant says the identified one or more keywords and/or key phrases in the each received audio file;
identifying a reward for the campaign participant based on at least one of the determined number of instances and the occurrence score; and
crediting an account of the campaign participant with the identified reward.

18. The computer-implemented method of claim 17, wherein determining, for each received audio file, a number of instances that the campaign participant says the identified one or more keywords and/or key phrases in the received audio file includes:
translating the spoken words in each audio file into text; and
counting the number of instances of the one or more keywords and/or key phrases in the text.

19. The computer-implemented method of claim 18, the operations further comprising:
using natural language processing to determine a sentiment indicator that identifies whether the text in the text file indicates that the campaign participant expressed positive or negative sentiment regarding each instance of the one or more keywords and/or key phrases in the text, wherein each instance of the one or more keywords and/or key phrases in the text is counted only if the instance is associated with a positive sentiment indicator.

20. The computer-implemented method of claim 17, the operations further comprising:
sending the one or more audio file over the wide area network to an application programming interface for a speech-to-text transcription service of a cloud computing platform; and
receiving a text file over the wide area network from the cloud computing platform, wherein the text file includes the text transcribed from the audio file.

* * * * *